US010309378B2

(12) United States Patent
Yoo et al.

(10) Patent No.: US 10,309,378 B2
(45) Date of Patent: Jun. 4, 2019

(54) SMART OPENING AND CLOSING APPARATUS

(71) Applicant: UNIVERSITY-INDUSTRY COOPERATION GROUP OF KYUNG HEE UNIVERSITY, Yongin-si, Gyeonggi-do (KR)

(72) Inventors: Shin Jung Yoo, Seoul (KR); Sang Gu Kim, Seoul (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 132 days.

(21) Appl. No.: 15/699,369

(22) Filed: Sep. 8, 2017

(65) Prior Publication Data

US 2018/0066637 A1 Mar. 8, 2018

(30) Foreign Application Priority Data

Sep. 8, 2016 (KR) ........................ 10-2016-0115816

(51) Int. Cl.
*A41F 1/00* (2006.01)
*F03G 7/06* (2006.01)

(52) U.S. Cl.
CPC ................ *F03G 7/065* (2013.01); *A41F 1/00* (2013.01)

(58) Field of Classification Search
CPC .................................. F03G 7/06; F03G 7/065
See application file for complete search history.

(56) References Cited

U.S. PATENT DOCUMENTS

2004/0074062 A1* 4/2004 Stanford, Jr. ...... A44B 18/0003 24/442
2017/0318881 A1* 11/2017 Fonte ..................... A41D 31/00

FOREIGN PATENT DOCUMENTS

KR 10-2004-0111492 A 12/2004
KR 10-0834554 B1 6/2008
KR 10-0936183 B1 1/2010
KR 10-1657407 B1 9/2016

OTHER PUBLICATIONS

Communication dated Apr. 27, 2018, issued by the Korean Patent Office in counterpart Korean Application No. 10-2016-0115816.

* cited by examiner

*Primary Examiner* — Mark A Laurenzi
*Assistant Examiner* — Xiaoting Hu
(74) *Attorney, Agent, or Firm* — Sughrue Mion, PLLC

(57) ABSTRACT

Discloses is a smart opening and closing apparatus. More particularly, the smart opening and closing apparatus includes an opening/closing means configured to be opened or closed depending upon application of a stimulus, a fixation means configured to maintain an open state of the opening/closing means by selectively interfering with the opening/closing means depending upon application of a stimulus, and a controller configured to control opening/closing of the opening/closing means by applying a stimulus to the opening/closing means and the fixation means and, in a state in which the stimulus is released, to control the fixation means to interfere with the opening/closing means so as to maintain a shape of the opening/closing means. In accordance with such a configuration, the shape of the opening/closing means may be maintained also in state in which a stimulus is not applied, whereby low-power operation may be accomplished.

13 Claims, 5 Drawing Sheets

SMART OPENING AND CLOSING APPARATUS

CROSS-REFERENCE TO RELATED APPLICATION

This application claims the priority benefit of Korean Patent Application No. 10-2016-0115816, filed on Sep. 8, 2016 in the Korean Intellectual Property Office, the disclosure of which is incorporated herein by reference.

BACKGROUND OF THE DISCLOSURE

Field of the Disclosure

The present invention relates to a smart opening and closing apparatus, more particularly to a smart opening and closing apparatus operable with low power using a two-way shape memory alloy.

Description of the Related Art

Recently, multifunctional clothes using shape memory alloys have been developed and popularized. As examples of garments to which such shape memory alloys are applied, there are a shirt, the lengths of sleeves of which are adjusted depending upon temperature; a jacket, a hem line of which is lifted by high-temperature stimulus; a dress, a part of which is opened and closed by electric stimulus; a fire fighting suit, the volume of an inner air layer of which is changed, and the like. Such garments using shape memory alloys generally use electrical stimulation for ease of operation.

Meanwhile, in the case of unidirectional shape memory alloys, a manual operation is required to return to original shapes thereof after the original shapes are changed by an electric stimulus. In the case of bidirectional shape memory alloys providing a bidirectional shape memory effect, continuous energy supply is required to maintain the shapes thereof after the shapes are changed by stimulation.

Accordingly, a variety of research has been continuously carried out to improve operational convenience for shape deformation and restoration of shape memory alloys and to realize low power consumption by reducing energy consumption.

RELATED DOCUMENTS

Patent Documents

Korean Patent No. 10-0834554
Korean Patent No. 10-0936183

SUMMARY OF THE DISCLOSURE

Therefore, the present invention has been made in view of the above problems, and it is one object of the present invention to provide a smart opening and closing apparatus operable with low power using a two-way shape memory alloy.

In accordance with the present invention, the above and other objects can be accomplished by the provision of a smart opening and closing apparatus including an opening/closing means configured to be opened or closed depending upon application of a stimulus; a fixation means configured to maintain an open state of the opening/closing means by selectively interfering with the opening/closing means depending upon application of a stimulus; and a controller configured to control opening/closing of the opening/closing means by applying a stimulus to the opening/closing means and the fixation means and, in a state in which the stimulus is released, to control the fixation means to interfere with the opening/closing means so as to maintain a shape of the opening/closing means.

In accordance with an aspect, the opening/closing means may include an opening/closing body; and an opening/closing member that is provided in the opening/closing body and configured to open/close a partial region of the opening/closing body depending upon application of a stimulus, wherein the opening/closing member includes a shape memory alloy memorizing an open or closed shape.

In accordance with an aspect, the fixation means may include at least a pair of fixation bodies arranged in a direction crossing the opening/closing member; and fixation members provided at ends of the fixation bodies to be transformed depending upon application of a stimulus, wherein the fixation members include a shape memory alloy memorizing a shape interfering with the opening/closing means or not interfering with the opening/closing means.

In accordance with an aspect, the opening/closing member may be provided inside and protected by a first protective member formed of a heat insulating and insulating material.

In accordance with an aspect, the fixation members may be provided inside and protected by a second protective member formed of a heat insulating and insulating material.

In accordance with an aspect, the controller may control such that an electric stimulus is applied to the opening/closing means and the fixation means with a time difference.

In accordance with an aspect, the controller may include a first controller controlling such that an electric stimulus is applied to the opening/closing means; and a second controller controlling such that an electric stimulus is applied to the fixation means, wherein the second controller applies an electric stimulus with a time difference from the first controller.

In accordance with an aspect, the first controller may transform a shape of the opening/closing member into a first shape, which closes at least portion of the opening/closing body when an electric stimulus to the opening/closing member is released, or a second shape, which at least portion of the opening/closing body is opened when an electric stimulus is applied to the opening/closing member, and the second controller may transform a shape of the opening/closing member into a first shape wherein the fixation members extending from the fixation bodies are bent into a hook shape so as to interfere with the opening/closing body when an electric stimulus to the fixation members is released, or a second shape wherein the bent fixation members rectilinearly extend from the fixation bodies not so as to interfere with the opening/closing body when an electric stimulus is applied to the fixation members.

In accordance with an aspect, after the second controller releases the electric stimulus earlier than the first controller in a state in which an electric stimulus is applied by the first and second controllers and thus the opening/closing member and fixation members are respectively transformed into the second shapes, thereby transforming the fixation members into the first shape to interfere with the second shape of the opening/closing member, the electric stimulus to the first controller may be released.

In accordance with another aspect of the present invention, there is provided a smart opening and closing apparatus including an opening/closing means configured to open/ close a slit depending upon application of a stimulus; a fixation means configured to maintain an open state of the slit opened by the opening/closing means by selectively interfering with the opening/closing means depending upon application of a stimulus; and a controller configured to control an open/closed state of the opening/closing means by selectively applying a stimulus to the opening/closing means and the fixation means, wherein the controller controls such that an open state of the slit is maintained, by applying a stimulus to the opening/closing means and the fixation means to open the slit and then more rapidly releasing the stimulus applied to the fixation means such that the fixation means physically interferes with the opening/closing means, followed by releasing the stimulus applied to the opening/closing means.

In accordance with an aspect, the opening/closing means may include an opening/closing body including the slit in at least a portion thereof; and an opening/closing member provided in the opening/closing body so as to open/close the slit depending upon application of a stimulus, wherein the opening/closing member includes a shape memory alloy memorizing a first shape closing the slit when a stimulus is released and a second shape opening the slit when a stimulus is applied.

In accordance with an aspect, the fixation means may include at least a pair of fixation bodies arranged in a direction crossing the opening/closing member; and fixation members provided at ends of the fixation bodies to be transformed depending upon application of a stimulus; wherein the fixation members include a shape memory alloy memorizing a first shape interfering with the opening/closing member when a stimulus is released and a second shape not interfering with the opening/closing member when a stimulus is applied.

In accordance with an aspect, the controller may include a first controller controlling such that an electric stimulus is applied to the opening/closing member; and a second controller controlling such that an electric stimulus is applied to the fixation members, wherein the second controller applies an electric stimulus with a time difference from the first controller, wherein, after the second controller releases the electric stimulus earlier than the first controller in a state in which an electric stimulus is applied by the first and second controllers and thus the opening/closing member and fixation members are respectively transformed into the second shapes, thereby interfering with the second shape of the opening/closing member, the electric stimulus to the first controller is released.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Hereinafter, the present invention will be described in detail by explaining particular embodiments of the invention with reference to the attached drawings. However, it should be understood that the spirit and scope of the present disclosure are not limited to the embodiments and can be modified by addition, modification, or deletion of elements constituting the embodiments and such additions, modifications, and deletions are also within the spirit and scope of the present disclosure.

Figure 1:
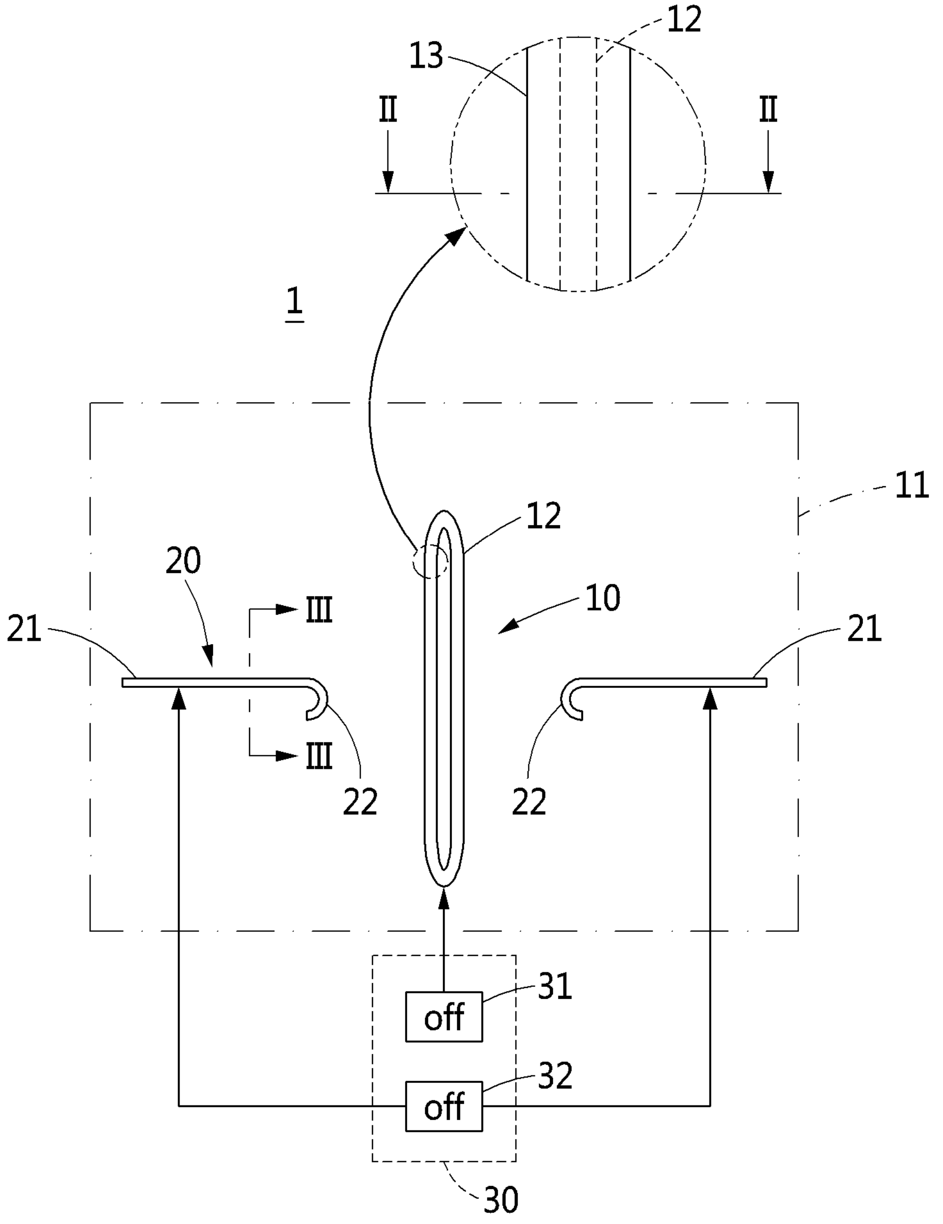
FIG. 1 is a plan view schematically illustrating a smart opening and closing apparatus according to a preferred embodiment of the present invention.

Referring FIG. 1, a smart opening and closing apparatus 1 according to a preferred embodiment of the present invention includes an opening/closing means 10, a fixation means 20, and a controller 30.

For reference, the smart opening and closing apparatus 1 described in the present invention is applied to a garment, and is exemplified as selectively opening and closing a part of the garment upon application of a stimulus according to environmental change such as temperature. However, the present invention is not limited thereto, and the smart opening and closing apparatus 1 described in this embodiment is applicable as various temperature-sensitive opening and closing means.

The opening/closing means 10 may be opened or closed depending upon application of a stimulus. Such an opening/closing means 10 includes an opening/closing body 11 and an opening/closing member 12. The opening/closing member 12 is provided in the opening/closing body 11 and opens or closes a partial region of the opening/closing body 11 depending upon application of a stimulus. Here, the opening/closing body 11 is a garment and the opening/closing member 12 is exemplified by opening or closing a slit S provided in the opening/closing body 11 (see FIG. 4).

The opening/closing member 12 is made of a two-way shape memory alloy memorizing open and closed states. More particularly, the opening/closing member 12 includes a shape memory alloy that memorizes a first shape closing the slit S of the opening/closing body 11 and a second shape opening the slit S of the opening/closing body 11.

For reference, in this embodiment, the opening/closing member 12 is exemplified as being formed of a nickel-, copper-, or iron-based shape-memory material. More particularly, the opening/closing member 12 may be made of a nitinol material or Ni—Ti material as an alloy of nickel (Ni) and titanium. Meanwhile, the shape memory alloy has a shape recovery temperature for returning to the original shape. When the temperature is higher than the shape recovery temperature, the shape memory alloy is in an "austenite" state. When the shape memory alloy in an austenite state is cooled, the state is changed to "martensite." In other words, when a stimulus is applied to a soft alloy in a martensite state to which a stimulus has not been applied, the soft alloy may be transformed into a stiff alloy in an austenite state.

Here, a curing degree of the shape memory alloy when transformed from the martensite state to the austenite state should be sufficient to transform the stiff austenite state, to which a stimulus has not been applied, into the soft martensite state. For reference, the opening/closing member 12 described in this embodiment includes a two-way shape memory alloy memorizing the austenite and martensite shapes. The properties of such a shape memory alloy may be understood through publicly known techniques, and thus, a detailed description thereof is omitted.

Figure 2:
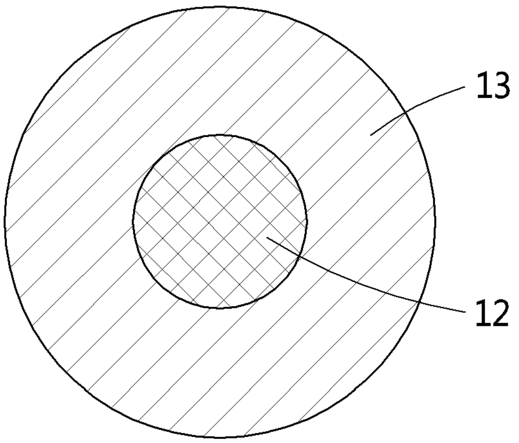
FIG. 2 is a schematic sectional view taken along line II-II of FIG. 1.

In addition, as illustrated in FIG. 2, the opening/closing member 12 is protected by a first protective member 13. The first protective member 13 is formed of a heat insulating and insulating material, thereby insulating heat generated from the opening/closing member 12 and insulting the opening/closing member 12. In accordance with this embodiment, the first protective member 13 is exemplified as including a silicone tube, but the present disclosure is not limited thereto.

The fixation means 20 interferes with the opening/closing means 10 depending upon application of a stimulus, thereby maintaining an open state of the slit S. Such a fixation means 20 includes fixation bodies 21 and fixation members 22. Here, each of the fixation members 22 is provided to be transformed according to a stimulus at each end of the fixation bodies 21.

The fixation bodies 21 are provided as a pair so as to face each other, and the opening/closing member 12 is provided between the fixation bodies 21. Such fixation bodies 21 are exemplified as having a parallel linear shape in a direction crossing the opening/closing member 12, but the present disclosure is not limited thereto. In addition, the fixation bodies 21 are illustrated and exemplified as being provided in a pair in the opening/closing body 11 including a garment. However, the present disclosure is not limited thereto, and may be provided in various modified arrangements such as a cross (+) arrangement so as to intersect each other with respect to the opening/closing member 12, parallel rows or columns, and the like.

Figure 4:
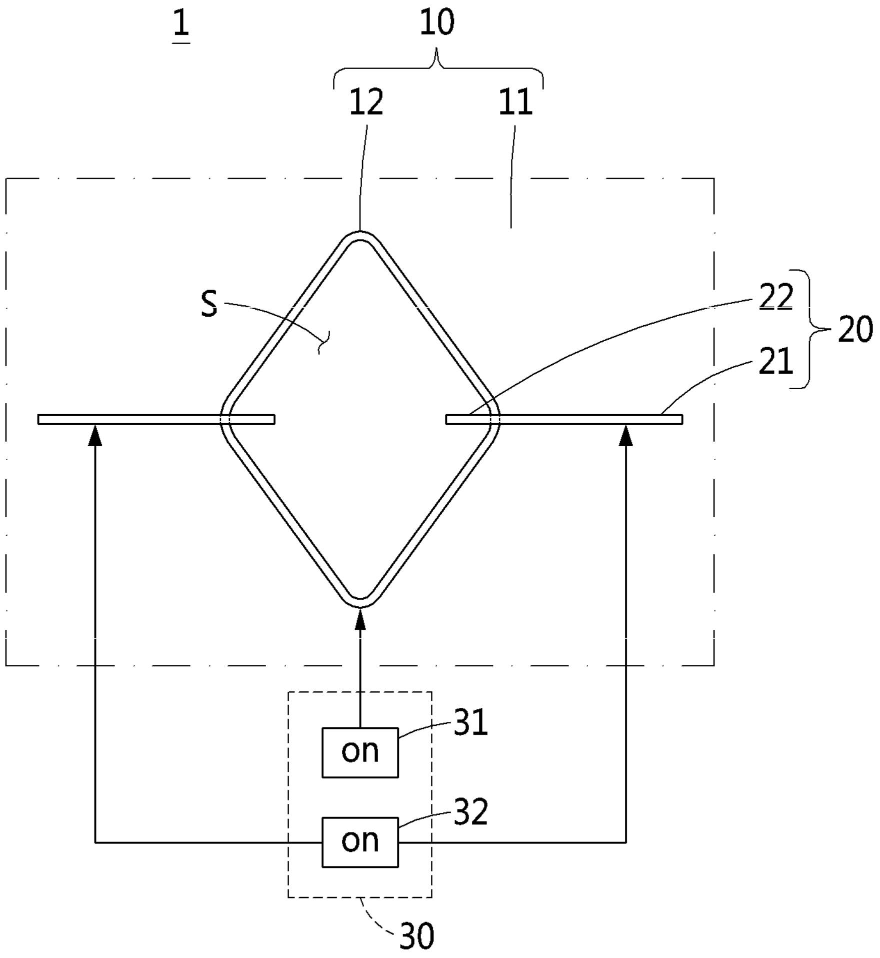
FIG. 4 is a plan view schematically illustrating opening operation of the smart opening and closing apparatus illustrated in FIG. 1.

Each of the fixation members 22 integrally extends from each of the pair of fixation bodies 21 and is formed of a shape memory alloy that memorizes the first shape capable of interfering with the opening/closing means 10 (see FIGS. 1 and 5) and the second shape not interfering with the opening/closing means 10 (see FIG. 4). In addition, such fixation members 22 include a two-way shape memory alloy formed of a nickel-, copper-, or iron-based shape-memory material, like the opening/closing member 12. A detailed description thereof is omitted.

The first shape of the fixation members 22 includes an integrally extending hook shape formed by bending ends of the fixation bodies 21 to be hooked onto and fixed to the opening/closing means 10, and the second shape includes a shape rectilinearly extending from the fixation bodies 21. However, the present disclosure is not limited thereto, and the fixation members 22 may be formed in various modified shapes such as modification of ends of the fixation bodies 21 into a tong shape to interfere with the opening/closing means 10.

Figure 3:
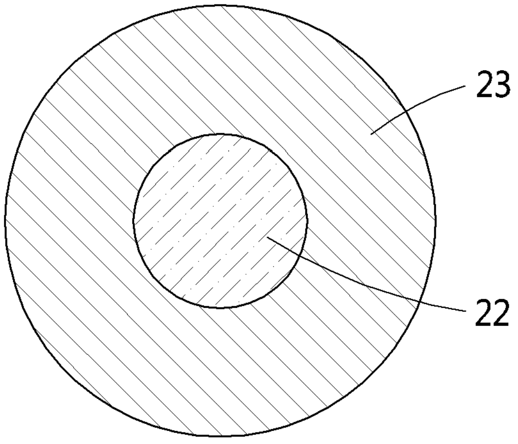
FIG. 3 is a schematic sectional view taken along line III-III of FIG. 1.

In addition, the fixation bodies 21 and the fixation members 22, which integrally extend from the fixation bodies 21, are surrounded and protected by a second protective member 23 as illustrated in FIG. 3. Like the first protective member 13, the second protective member 23 is also formed of a heat insulating and insulating material, thereby heat-insulating and insulating the fixation members 22, and is exemplified as including a silicone tube.

The controller 30 controls opening/closing of the opening/closing means 10 by applying a stimulus to the opening/closing means 10 and the fixation means 20. The controller 30 applies an electric stimulus to the opening/closing means 10 and the fixation means 20. Such a controller 30 includes first and second controllers 31 and 32, and applies a stimulus to the opening/closing means 10 and the fixation means 20 with a time difference.

Figure 5:
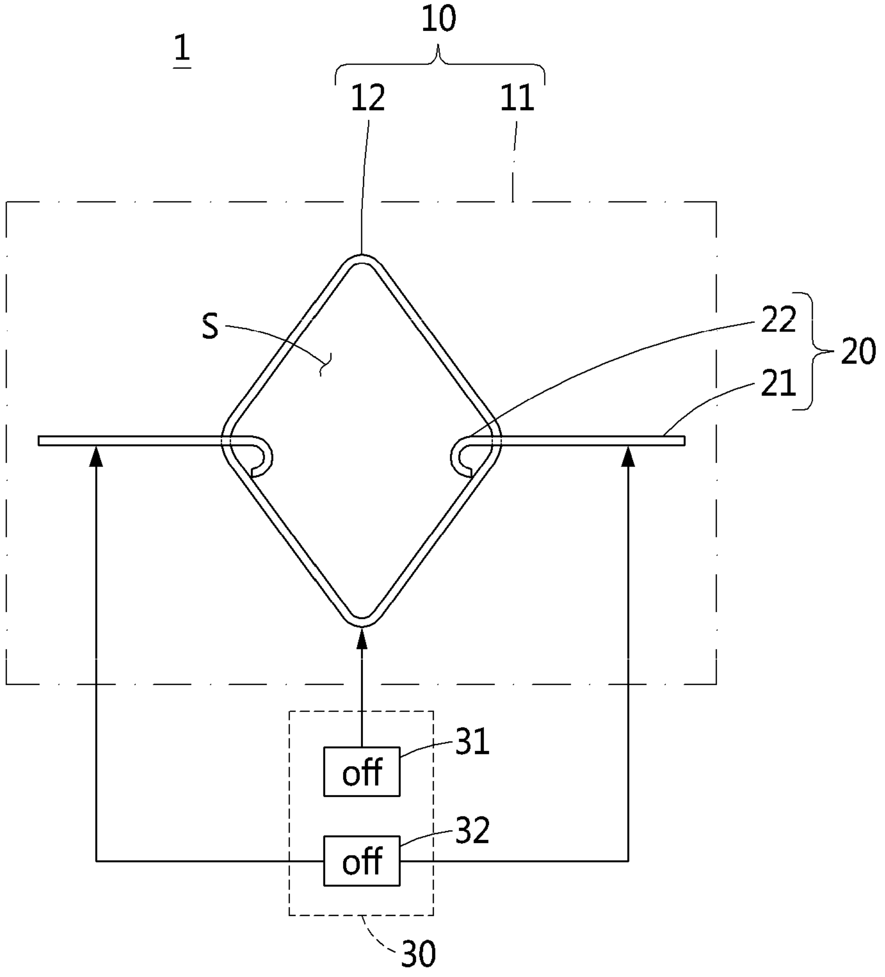
FIG. 5 is a plan view schematically illustrating maintenance of the open state of the smart opening and closing apparatus illustrated in FIG. 4.

The first controller 31 controls application of an electric stimulus to the opening/closing means 10. The first controller 31 is connected to the opening/closing member 12 and thus controls an opening/closing operation of the opening/closing member 12. More particularly, when the first controller 31 is turned on, an electric stimulus is applied to the connected opening/closing member 12, and thus, the shape of the opening/closing member 12 is transformed such that the slit S is opened as illustrated in FIG. 4. In addition, when the first controller 31 is turned off as illustrated in FIG. 5, an electric stimulus on the connected opening/closing member 12 is released and thus the opening/closing member 12 is transformed into a shape closing the slit S as illustrated in FIG. 1.

That is, depending upon an electric stimulus by the first controller 31, the opening/closing member 12 is transformed into a shape opening or closing the slit S provided in the opening/closing body 11.

The second controller 32 controls application of an electric stimulus to the fixation means 20. Here, the second controller 32 may control application of an electric stimulus to the fixation members 22 of the fixation means 20 with a time difference from the first controller 31. Such a second controller 32 is connected to the fixation members 22, and thus, transforms the fixation members 22 into the aforementioned first or second shape depending upon application of an electric stimulus.

More particularly, when the second controller 32 is turned off and thus an electric stimulus is released, the fixation members 22 are transformed into the first shape wherein ends of the fixation bodies 21 are bent into a hook shape as illustrated in FIG. 1. In addition, when the second controller 32 is turned on and an electric stimulus is applied to the fixation members 22, the fixation members 22 are transformed into the second shape wherein the fixation members 22 rectilinearly extend from the fixation bodies 21 as illustrated in FIG. 4. Here, the second controller 32 is turned off faster than the first controller 31 and thus interferes with the opening/closing member 12 in an open state.

Meanwhile, although the controller 30 is exemplified as including the first and second controllers 31 and 32 and thus respectively applies an electric stimulus to transform the shapes of the opening/closing member 12 and the fixation members 22 in this embodiment, the present disclosure is not limited thereto. For example, the controller 30 may be provided with a timer (not shown), or various modified embodiments such as control of application of an electric stimulus to transform the opening/closing member 12 and the fixation members 22 with a time difference by controlling an on/off frequency are naturally possible.

Hereinafter, an opening/closing operation of the smart opening and closing apparatus 1 according to the present disclosure having the aforementioned configuration is described with reference to FIGS. 4 to 6.

First, as illustrated in FIG. 4, when the first and second controllers 31 and 32 are turned on and an electric stimulus is applied, the first shape of each of the connected opening/closing member 12 and fixation members 22 is transformed into the second shape. That is, when an electric stimulus is applied by the first controller 31, the first shape, wherein the slit S is closed, of the opening/closing member 12 is transformed into the second shape wherein the slit S is opened. In addition, due to an electric stimulus applied by the second controller 32, the first shape, which interferes with the opening/closing member 12, of the fixation members 22 is transformed into the second shape, which does not interfere with the opening/closing member 12.

Subsequently, as illustrated in FIG. 5, the first and second controllers 31 and 32 are turned off, whereby an electric stimulus is released. Here, the first controller 31 is turned off earlier than the second controller 32 and thus an electric stimulus is released with a time difference, whereby the fixation members 22 connected to the second controller 32 are more rapidly transformed into the second shape wherein ends of the fixation bodies 21 are bent in a hook shape.

As such, the opening/closing member 12 having an open shape is hooked onto and fixed to the fixation members 22 and thus the first controller 31 is turned off later than the second controller 32 with a time difference, whereby the open second shape is maintained although an electric stimulus is released. That is, although an electric stimulus is released by the first controller 31, the first shape of the fixation members 22 physically interferes with transforming force of transforming into the first shape, as a closed shape, of the opening/closing member 12. Accordingly, the open state of the slit S may be maintained also in a non-electric power state in which an electric stimulus by the first and second controllers 31 and 32 is released.

Figure 6:
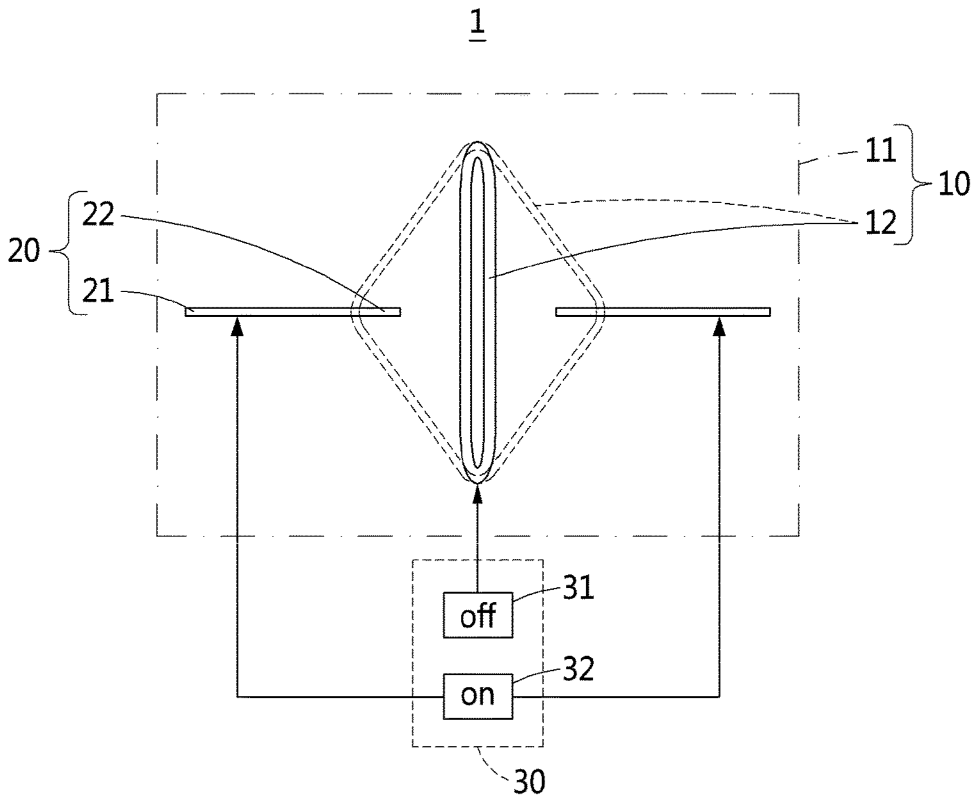
FIG. 6 is a plan view schematically illustrating a closing operation of the smart opening and closing apparatus illustrated in FIG. 5.

Subsequently, as illustrated in FIG. 6, when an electric stimulus is applied to the fixation members 22 again by the second controller 32, the fixation members 22 are transformed into the second shape not interfering the opening/closing member 12, thereby being released from the opening/closing member 12. Accordingly, the opening/closing member 12 is transformed into the first shape wherein the slit S is closed.

In accordance with the present disclosure having the aforementioned configuration, first, the shape of the opening/closing means may be maintained due to interference of the fixation means although an electric stimulus is released, whereby continuous stimuli are not necessary and thus energy consumption may be reduced.

Second, economic efficiency increases due to energy consumption reduction, whereby there are advantage in securing diversity of a smart opening and closing apparatus.

Third, since opening/closing of a slit may be controlled and the shape thereof may be fixed using a two-way shape memory alloy, operational convenience is improved and thus efficiency increases.

While the present invention has been described referring to the preferred embodiments, those skilled in the art will appreciate that many modifications and changes can be made to the present invention without departing from the spirit and essential characteristics of the present invention.

DESCRIPTION OF SYMBOLS

1: SMART OPENING AND CLOSING APPARATUS
10: OPENING/CLOSING MEANS
11: OPENING/CLOSING BODY
12: OPENING/CLOSING MEMBER
13: FIRST PROTECTIVE MEMBER
20: FIXATION MEANS
21: FIXATION BODIES
22: FIXATION MEMBERS
23: SECOND PROTECTIVE MEMBER
30: CONTROLLER
31: FIRST CONTROLLER
32: SECOND CONTROLLER
S: SLIT

What is claimed is:

1. A smart opening and closing apparatus, comprising:
an opening/closing means configured to be opened or closed depending upon application of a first stimulus;
a fixation means configured to maintain an open state of the opening/closing means by selectively interfering with the opening/closing means depending upon application of a second stimulus; and
a controller configured to control opening and closing of the opening/closing means by applying the first stimulus to the opening/closing means and the second stimulus to the fixation means and, in a state in which the first stimulus and the second stimulus are released, to control the fixation means to interfere with the opening/closing means so as to maintain the open state of the opening/closing means.

2. The smart opening and closing apparatus according to claim 1, wherein the opening/closing means comprises:
an opening/closing body; and
an opening/closing member that is provided in the opening/closing body and configured to open and close a partial region of the opening/closing body depending upon application of the first stimulus,
wherein the opening/closing member comprises a shape memory alloy memorizing a first shape that is a closed shape and a second shape that is an open shape.

3. The smart opening and closing apparatus according to claim 2, wherein the fixation means comprises:
at least a pair of fixation bodies arranged in a direction crossing the opening/closing member; and
fixation members provided at ends of the fixation bodies to be transformed depending upon application of the second stimulus,
wherein the fixation members comprise a shape memory alloy memorizing a first shape interfering with the opening/closing means and a second shape not interfering with the opening/closing means.

4. The smart opening and closing apparatus according to claim 3, wherein the fixation members are provided inside and protected by a second protective member formed of a heat insulating and insulating material.

5. The smart opening and closing apparatus according to claim 3, wherein the controller comprises:
a first controller configured to control the application of a first electric stimulus as the first stimulus to the opening/closing means; and
a second controller configured to control the application of a second electric stimulus as the second stimulus to the fixation means,
wherein the second controller is configured to apply the second electric stimulus with a time difference from the application of the first electric stimulus by the first controller.

6. The smart opening and closing apparatus according to claim 5, wherein the first controller transforms a shape of the opening/closing member into the first shape, which closes at least a portion of the opening/closing body, by releasing the first electric stimulus to the opening/closing member, or the second shape, which opens at least the portion of the opening/closing body, by applying the first electric stimulus to the opening/closing member, and
the second controller transforms a shape of the fixation members into the first shape wherein the fixation members extending from the fixation bodies are bent into a hook shape so as to interfere with the opening/closing member by releasing the second electric stimulus to the fixation members, or the second shape wherein the fixation members rectilinearly extend from the fixation bodies so as to not interfere with the opening/closing member by applying the second electric stimulus to the fixation members.

7. The smart opening and closing apparatus according to claim 6, wherein, in a state in which the first and second electric stimuli are applied by the first and second controllers and thus the opening/closing member and the fixation members are respectively transformed into the second shapes, the second controller is configured to release the second electric stimulus earlier than the first controller releasing the first electric stimulus, thereby transforming the fixation members into the first shape to interfere with the second shape of the opening/closing member, and the first controller is configured to release the first electric stimulus thereafter.

8. The smart opening and closing apparatus according to claim 2, wherein the opening/closing member is provided inside and protected by a first protective member formed of a heat insulating and insulating material.

9. The smart opening and closing apparatus according to claim 1, wherein the controller is configured to control the application of a first electric stimulus as the first stimulus to the opening/closing means and a second electric stimulus as the second stimulus to the fixation means with a time difference.

10. A smart opening and closing apparatus, comprising:

an opening/closing means configured to open and close a slit depending upon application of a first stimulus;

a fixation means configured to maintain an open state of the slit opened by the opening/closing means by selectively interfering with the opening/closing means depending upon application of a second stimulus; and a controller configured to control an open state and a closed state of the opening/closing means by selectively applying the first stimulus to the opening/closing means and the second stimulus to the fixation means, wherein the controller is configured to maintain the open state of the slit by applying the first and second stimuli to the opening/closing means and the fixation means to open the slit and then more rapidly releasing the second stimulus applied to the fixation means such that the fixation means physically interferes with the opening/closing means, followed by releasing the first stimulus applied to the opening/closing means.

11. The smart opening and closing apparatus according to claim 10, wherein the opening/closing means comprises:

an opening/closing body comprising the slit in at least a portion thereof; and an opening/closing member provided in the opening/closing body so as to open and close the slit depending upon application of the first stimulus, wherein the opening/closing member comprises a shape memory alloy memorizing a first shape closing the slit when the first stimulus is released and a second shape opening the slit when the first stimulus is applied.

12. The smart opening and closing apparatus according to claim 11, wherein the fixation means comprises:

at least a pair of fixation bodies arranged in a direction crossing the opening/closing member; and fixation members provided at ends of the fixation bodies to be transformed depending upon application of the second stimulus, wherein the fixation members comprise a shape memory alloy memorizing a first shape interfering with the opening/closing member when the second stimulus is released and a second shape not interfering with the opening/closing member when the second stimulus is applied.

13. The smart opening and closing apparatus according to claim 12, wherein the controller comprises:

a first controller configured to control the application of a first electric stimulus as the first stimulus to the opening/closing member; and a second controller configured to control the application of a second electric stimulus as the second stimulus to the fixation members, wherein the second controller is configured to apply the second electric stimulus with a time difference from the application of the first electric stimulus by the first controller, wherein, in a state in which the first and second electric stimuli are applied by the first and second controllers and thus the opening/closing member and the fixation members are respectively transformed into the second shapes, the second controller is configured to release the second electric stimulus earlier than the first controller releasing the first electric stimulus, thereby interfering with the second shape of the opening/closing member, and the first controller is configured to release the first electric stimulus thereafter.

* * * * *